United States Patent Office

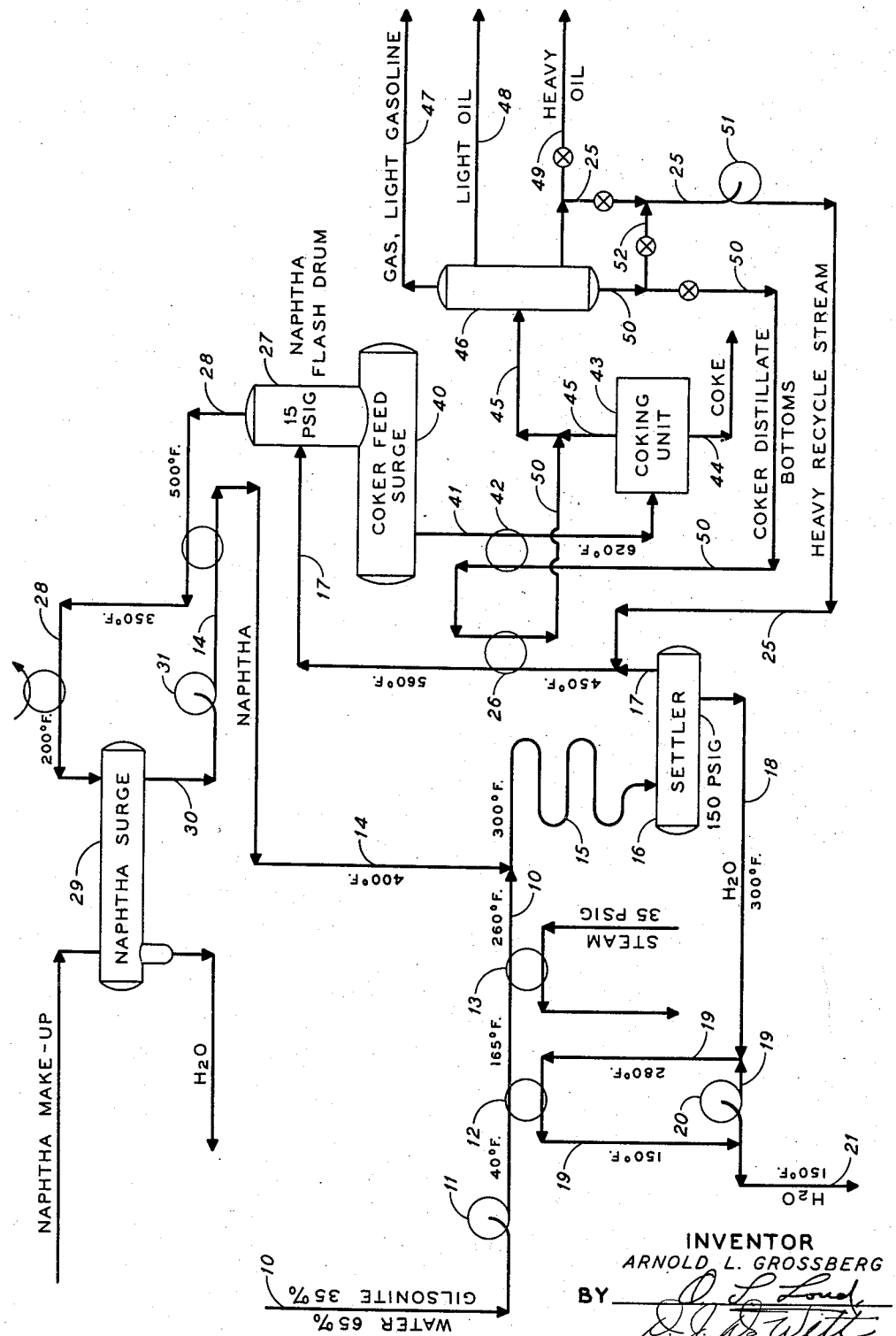

2,879,222
Patented Mar. 24, 1959

2,879,222

METHOD FOR RECOVERING ASPHALTIC PRODUCTS FROM MIXTURES THEREOF WITH WATER

Arnold L. Grossberg, Berkeley, Calif., assignor to California Research Corporation, San Francisco, Calif., a corporation of Delaware Application September 21, 1956, Serial No. 611,304

5 Claims. (Cl. 208—85)

This invention relates to a method for removing asphaltic materials present in a mixture thereof with water.

It has been found convenient to handle various high melting, normally solid materials such, for example, as the various natural and synthetic asphalts and asphaltites, in the form of a suspension or slurry of finely divided particles in water. However, the recovery of these materials from the aqueous system presents serious problems, particularly when the normally solid material is to be converted or otherwise processed at temperatures well above the melting point thereof. Thus, while the solid product can be filtered from the system, the residual water content of the filter cake is still so high as to give rise to serious foaming and other hydrocarbon entrainment difficulties as the wet material is thereafter melted or admixed with a high boiling oil for further processing.

While the invention is broadly applicable to the treatment of a variety of asphaltic products, it has been found to be of particular utility in the processing of aqueous slurries of an asphaltite product commonly known as gilsonite. Accordingly, for the sake of greater clarity the invention wil be more fully described hereinafter as it relates to the processing of a water-gilsonite feed mixture.

The present invention is based on the discovery that gilsonite or other asphaltic particles present in a water mixture can be recovered in the form of a solution in a relatively heavy, hydrocarbon oil by a procedure involving the following interrelated steps: The incoming aqueous-asphaltic mixture is first heated to a temperature of at least 225° F. under pressure conditions such that the water remains in the liquid phase, and with the temperature being maintained below that level giving rise to incipient or other melting of the asphaltic component. In this step care should be taken to control the temperature of any heating medium employed so that the heat exchange surfaces coming in contact with the water-asphaltic stream also remain at temperatures well below those giving rise to incipient melting of the asphaltic component, thereby avoiding formation of tacky deposits on such surfaces. Thereafter the heated mixture is admixed with hot naphtha in the amount of at least one volume (and preferably from 1 to 3 volumes) per volume of the asphaltic component of the feed, calculated as liquid, whereby said asphaltic component is dissolved in the added naphtha. After allowing the mixture to come to equilibrium, as by passage through a soaking coil or the like, the stream is passed to a settler from which is withdrawn a liquid aqueous phase and a naphtha-asphaltic phase. The latter is then admixed with a hot, heavy oil in an amount which preferably is at least equal to the volume of naphtha present, good results normally being obtained by the addition of from about 1 to 3 volumes of said heavy oil for each volume of liquid gilsonite or other asphaltic material present. The temperature of the resulting liquid, if not already sufficiently high, is then raised to a level above the melting point of the asphaltic component and sufficiently high as to permit the naphtha component to be flashed overhead as the mixture is passed at relatively low pressures into a naphtha flash drum, said naphtha being recycled for admixture with the incoming feed, as described above. The remaining material, now at a temperature above the melting point of the gilsonite or other asphaltic component present, is recovered as a homogeneous liquid stream which is ready to be processed in any desired fashion, as by passage to a coker or other hydrocarbon conversion zone. In said zone, portions of the heavy oil component present are also converted along with, for example, the gilsonite, while a heavy oil suitable for admixture with the naphtha-asphaltic liquid phase can be recovered from the liquid product of any such conversion zone.

The naphtha component referred to above can be selected from a wide variety of hydrocarbon streams boiling in a range of from about 150° to 550° F., though the preferred range is from about 190° to 450° F. Typical streams of this character are petroleum naphthas of straight-run, catalytic or thermal cracked origin, and a satisfactory naphtha may even be derived from coker distillate obtained by coking the oil solution of the gilsonite or other asphaltic material being processed. Such naphthas, boiling above 190° F., are substantially free of $C_6$ and lower components and may therefore be properly designated as dehexanized petroleum naphthas.

The heavy oil employed in the process is one boiling above about 600° F. and preferably above about 650° F. the heavy oil commonly employed being at 650° F.+ gas oil recovered from the liquid product obtained on subjecting the oil-gilsonite stream to a coking or other conversion operation, said oil having an end point between about 800° and 1100° F.

The manner in which the present invention may be practiced can be illustrated by reference to the figure of the appended drawing which is a somewhat simplified flow scheme of a refinery unit adapted to be employed in connection with the present process. For the sake of greater clarity, said figure is described below in the example wherein details are given of a gilsonite recovery and conversion operation.

*Example*

In this operation, a water (65 wt. percent)-gilsonite (35 wt. percent) slurry is supplied to the unit of the figure through line 10 at a temperature of 40° F., the incoming feed stream being placed under the desired pressure (here about 150 p.s.i.g.) by pump 11. The pressurized stream is now heated to a temperature of about 260° F. by passage through heat exchangers 12 and 13 wherein the heating medium employed in each is controlled at a temperature below the incipient melting point of the gilsonite, the latter being regarded as approximately 300° F. The heated, liquid feed stream is now admixed with hot (400° F.) naphtha boiling between about 296° and 430° F., said naphtha being supplied under pressure through line 14 in an amount equivalent to about 2 volumes for each volume of (liquid) gilsonite. The resulting mixture is then passed through a soaking coil 15 and thence into settler 16 from which a gilsonite-naphtha solution is taken overhead through line 17. The aqueous phase is drawn off through line 18 for recycle through heat exchanger 12, loop 19 and pump 20 before being discharged from the system through line 21, it being important to note that the water passing through said exchanger is held at a temperature below 300° F. as indicated by the temperatures given in the figure.

The naphtha-gilsonite stream in line 17 is now admixed with hot (650° F.) gas oil boiling between about 600° and 1050° F. as supplied under pressure from line 25 in an amount approximately equal to that of the naphtha component. Following the introduction of the gas oil, the temperature of the stream is raised by passage through heat exchanger 26 to a level permitting the naphtha component to be vaporized as the stream is introduced into the flash drum 27 operated at relatively low pressure, 15 p.s.i.g. The vaporized naphtha passes via line 28 to storage in surge drum 29 and can thereafter be heated and returned under pressure to the system, as desired, through lines 30, 14 and pump 31.

The hot gilsonite-heavy oil solution remaining in surge tank 40 after the naphtha has been flashed therefrom is ready to be processed in any desired fashion. In the preferred practice of the present invention, the solution is passed through line 41 and heat exchanger 42 to a coking unit generally indicated at 43, said unit being of the delayed, fluid, or other desired type. Coke is removed from unit 43, as through line 44, while the coker distillate is taken via line 45 to a fractionating column 46. Various relatively light product streams are recovered from the column 46 as, for example, through lines 47 and 48. A relatively high boiling gas oil stream is taken from the column through line 49, while the residue passes through line 50. A portion of the heavy gas oil in line 49 is normally removed from the system shown in the figure, while the balance is recycled through line 25 and pump 51 for admixture with the naphtha-gilsonite solution in line 17. Likewise, while a portion of the residual stream in line 50 may also be discharged from the particular system shown, said stream is preferably left therein and divided, with a portion being diverted via line 52 for use as a part of the recycle stream in line 25, while the balance is passed through heat exchangers 26 and 42 before being returned to column 46.

In the foregoing example it will be noted that the amount of heavy oil added to the naphtha-gilsonite stream in line 17 is approximately equal to that of the naphtha present. If desired, however, the amount of recycle oil employed may be greater or even less than that of the naphtha present, good results normally being obtained by the addition of from about 1 to 3 volumes of said heavy oil for each volume of liquid gilsonite or other asphaltic material present.

I claim:

1. A process for removing the asphaltic portion from a mixture of water and solid particles of asphaltic material, said process comprising maintaining said mixture under elevated pressure sufficient to maintain said water in a liquid state while heating said mixture to at least 225° F., the temperatures of all heat exchange surfaces coming in contact with said mixture being maintained substantially below the melting point of the asphaltic material during said heating step; passing hot naphtha into said heated mixture in an amount sufficient to dissolve the asphaltic material present; separating the resulting naphtha-asphalt phase from the remaining aqueous phase; admixing said naphtha-asphalt phase with a hot, heavy hydrocarbon oil boiling above the end point of the naphtha; and passing the resulting oil-naphtha-asphaltic system into a vaporization zone at a temperature above the melting point of the asphaltic component and above the boiling point of the naphtha present whereby said naphtha is flashed overhead and a liquid stream comprised of said heavy oil and molten asphaltic material is recovered as bottoms.

2. The process of claim 1 wherein the naphtha flashed overhead in the last mentioned separation step is recycled for admixture with the incoming heated mixture of water and solid asphaltic material, and wherein the last mentioned bottoms stream is essentially comprised of a solution of the asphaltic material in the hot, heavy oil.

3. A process for removing the asphaltic portion from a mixture of water and solid particles of asphaltic material, said process comprising maintaining said mixture under elevated pressure sufficient to maintain said water in a liquid state while heating said mixture to at least 225° F., the temperatures of all heat exchange surfaces coming in contact with said mixture being maintained substantially below the melting point of the asphaltic material during said heating step; passing hot naphtha into said heated mixture in an amount sufficient to dissolve the asphaltic material present; separating the resulting naphtha-asphalt phase from the remaining aqueous phase; admixing said naphtha-asphalt phase with a hot, heavy hydrocarbon oil boiling above the end point of the naphtha; passing the resulting oil-naphtha-asphaltic system into a vaporization zone at a temperature above the melting point of the asphaltic component and above the boiling point of the naphtha present whereby said naphtha is flashed overhead and a liquid stream comprised of said heavy oil and molten asphaltic material is recovered as bottoms; passing said bottoms through a coking zone whereby the components present therein are converted to normally gaseous, normally liquid and carbonaceous products; and recovering from said liquid products the said hot, heavy hydrocarbon oil for admixture with the naphtha-asphalt phase.

4. A unitary process for converting gilsonite to normally gaseous, normally liquid and carbonaceous products, which comprises: forming a slurry of water and solid gilsonite particles; heating said slurry to a temperature above about 225° F. and below about 300° F. while maintaining the water present therein in the liquid phase, said heating being effected by the use of temperatures below the incipient melting point of the gilsonite; admixing the heated slurry with naphtha supplied at a temperature above about 300° F. and in an amount of from about 1 to 3 volumes per volume of gilsonite, and allowing the resulting mixture to come to equilibrium; separating the mixture into an aqueous phase and a naphtha-gilsonite phase; passing said aqueous phase, at a temperature below the incipient melting point of the gilsonite, in heat exchange relationship with the incoming water-gilsonite slurry; admixing said naphtha-gilsonite phase with a hot, coker recycle oil boiling above the end point of the naphtha, said oil being added in an amount at least equal to that of the naphtha present; passing the resulting oil-naphtha-gilsonite system into a vaporization zone at a temperature above the melting point of the gilsonite component and above the boiling point of the naphtha present whereby said naphtha is flashed overhead and a liquid stream comprised of said recycle oil and molten gilsonite is recovered as bottoms; passing said bottoms through a coking zone whereby the components therein are converted to normally gaseous, normally liquid and carbonaceous products, and recovering from said liquid products the said hot recycle oil stream for admixture with the naphtha-gilsonite phase.

5. The process of claim 4 wherein the naphtha employed is a deheganized, petroleum naphtha fraction boiling below about 450° F., and wherein the coker recycle oil employed is one boiling above about 650° F.

References Cited in the file of this patent

UNITED STATES PATENTS

| | | |
|---|---|---|
| 1,688,859 | Egloff et al. | Oct. 23, 1928 |
| 2,383,363 | Batchelder | Aug. 21, 1945 |
| 2,726,196 | Bloomer | Dec. 6, 1955 |

OTHER REFERENCES

Chemical and Engineering News, vol. 34, No. 30, July 23, 1956, page 3546, article Solid Source of Gasoline.

UNITED STATES PATENT OFFICE
CERTIFICATE OF CORRECTION

Patent No. 2,879,222

March 24, 1959

Arnold L. Grossberg

It is hereby certified that error appears in the printed specification of the above numbered patent requiring correction and that the said Letters Patent should read as corrected below.

Column 2, line 33, for "being at" read -- being a --; column 4, line 61, for "deheganized" read -- dehexanized --.

Signed and sealed this 28th day of July 1959.

(SEAL)
Attest:

KARL H. AXLINE
Attesting Officer

ROBERT C. WATSON
Commissioner of Patents